United States Patent [19]

Donner et al.

[11] Patent Number: 4,617,893
[45] Date of Patent: Oct. 21, 1986

[54] SPEED LIMITING SYSTEM FOR A MOTOR VEHICLE INCLUDING A SWITCH AND A METHOD FOR POSITIONING THE SWITCH

[75] Inventors: Bernd Donner, Uhldingen-Mühlhofen; Hartmut Schultze; Lutz Jähnig, both of Villingen-Schwenningen, all of Fed. Rep. of Germany

[73] Assignee: Mannesmann Kienzle GmbH, Villingen-Schwenningen, Fed. Rep. of Germany

[21] Appl. No.: 758,498

[22] Filed: Jul. 24, 1985

[30] Foreign Application Priority Data

Jul. 25, 1984 [DE] Fed. Rep. of Germany ....... 3427329

[51] Int. Cl.$^4$ .............................................. E02D 41/14
[52] U.S. Cl. ..................................... 123/361; 123/376
[58] Field of Search ............... 123/342, 361, 376, 399, 123/400

[56] References Cited

U.S. PATENT DOCUMENTS

| | | | |
|---|---|---|---|
| 4,181,103 | 1/1980 | Sturdy | 123/342 |
| 4,436,069 | 3/1984 | Collonia | 123/376 |
| 4,474,083 | 10/1984 | Braun | 123/342 |
| 4,523,564 | 6/1985 | Sturdy | 123/361 |
| 4,523,565 | 6/1985 | Omitsu | 123/399 |
| 4,531,489 | 7/1985 | Sturdy | 123/376 |
| 4,532,901 | 8/1985 | Sturdy | 123/361 |
| 4,543,932 | 10/1985 | Sturdy | 123/376 |

FOREIGN PATENT DOCUMENTS

2451286 11/1980 France .................... 123/361

*Primary Examiner*—William A. Cuchlinski, Jr.
*Attorney, Agent, or Firm*—Toren, McGeady, Stanger, Goldberg & Kiel

[57] ABSTRACT

A method for positioning a switch in a speed limiting device, wherein, for a limit switch, which interrupts the controlling process of the speed limiting device consisting of an electronic control unit, an electromechanical servo unit and a mechanical clutch arrangement, a positioning method is utilized and in order to carry out this method, an arrangement is provided in which the limit switch is fastened on a slide which is displaceably supported with the servo component of the speed limiting device. Arranged in the slide, which, in addition, carries a switchover contact bank serving to actuate the switch, there are provided locking bars with which, together with catch paths constructed at a housing of the servo unit, an exact fixing of the slide can be achieved at the end of the positioning process by means of reversing the rotational direction of the servo motor.

7 Claims, 7 Drawing Figures

SPEED LIMITING SYSTEM FOR A MOTOR VEHICLE INCLUDING A SWITCH AND A METHOD FOR POSITIONING THE SWITCH

The present invention is directed generally to speed limiting devices for motor vehicles and more particularly to a speed limiting device including an operating switch. More specifically, the invention is directed to a method for positioning the switch assigned to the speed limiting device, the switch operating to switch off a servo motor or regulating motor of the speed limiting device.

In a device of the type to which the present invention relates, the servo motor of the speed limiting device includes a servo component or actuator and the servo motor actuates a clutch coupling by means of the servo component or actuator. The clutch coupling is connected in a gear connection between a gas pedal of the vehicle and fuel dosing apparatus for the vehicle engine. The switch of the speed limiting device switches off the servo motor of the speed limiting device when, during the control process, a certain lower boundary of the rotational speed of the vehicle engine is reached or, at the latest, when the maximum relative stroke between the gas pedal and the fuel dosing apparatus is reached, which relative stroke is enabled by means of the clutch coupling.

The performance and power characteristics of modern vehicle drive systems are generally designed as to capacity in such a way as to provide satisfactory power, even under high loads, for example, as might occur during traveling in inclines or under adverse road conditions. Thus, the vehicle must generally be provided with the capacity for reserve power.

On the other hand, such contingencies may cause operation of the vehicle at relatively high speeds on level roads or on downgrades. At the same time, it has recently been recognized to an increasing degree that the use of speed limiting devices, at least in utility or commercial vehicles, is a desirable expedient and advisable as an operating element of the vehicle for several reasons. On the one hand, a speed limiting device relieves the professional driver from the necessity of constantly checking the speed of his vehicle, often during hours of monotonous driving conditions. Such professional drivers are in most cases obliged to effect transportation assignments as soon as possible. Furthermore, it easily enables the driver to maintain the speed of the vehicle within permissible limits and within desired ranges, given the type of road involved. Furthermore, utilization of a speed limiting device enables enforcement of economical driving operation with respect to fuel consumption and wear on the vehicle. At the same time, it permits the driver a broad, individual latitude of freedom of driving style within the boundary of the range to which the speed is to be limited.

With a speed limiting system of the type to which the present invention relates, there is no substantial adverse effect on the accelerator pedal nor is the operation of the vehicle impaired by control oscillations or hunting fluctuations of the system when the boundary speed is reached and the control process begins. Moreover, in contrast to driving restrictions which are applied by local rules and regulations, use of a speed limiting system provides an active, reliable safety system which is acceptable to the driver and for other road users, despite the fact that it may result in a certain restriction in the personal driving style of individual operators. In other words, the technical expedient of speed limiting devices reduces the likelihood that the vehicle will be operated at excessive speed and that other driving errors may occur and it is an effective means for reducing the risk of accidents.

Despite the advantages discussed above, there arises some reluctance to utilize such speed limiting systems. The determining factor in this regard is not lack of appreciation of the value and advisability of the speed limiting system, but rather, concern that that the respective vehicle will be difficult to maneuver during failure of the system and that equippage of a vehicle with a speed limiting system may necessitate an extremely involved and time-consuming operation.

Even when the assembly may be carried out in the engine compartment, this is less a matter of inserting the clutch arrangement, which makes possible a modification of the gear connection between the accelerator pedal and the fuel dosing apparatus, in this gear connection, i.e., in the respective gas actuator or throttle linkage of the carburetor control and attachment fitting or installation of the servo unit which is connected with the clutch arrangement by means of a Bowden cable at a suitable location on the vehicle chassis and, under certain circumstances, installing an electronic control unit in the driver's compartment. Rather, it is more a matter of adjusting a switch, preferably located in the servo unit, by means of which the servo motor can be switched off in a determined end or final position of the switching member. Such a switch is necessary because, as a rule, the throttle linkage is defined between the idling and full acceleration positions by means of mechanical stops and during full use of the possible displacing or adjusting stroke, there is the risk that damage will occur, for example, also to the servo motor, i.e., in order to avoid damage, the switch has the object of promptly and automatically switching off the regulating process and control process, respectively.

Depending upon the location in the engine compartment of the servo unit, particularly in a subsequent installation, the positioning of the switch may be extremely difficult, must be repeated and checked a number of times when the servo unit is opened and generally cannot be carried out by one person. Understandably, special difficulties result if the engine of the vehicle is only accessible by means of tilting of the driver's cab between the positioning operation and the checking of the latter; the vehicle must, in each instance, be returned again to a state in which it is ready for driving and, during this time, i.e., between the ready-to-drive state of the vehicle and the state in which the vehicle is tilted, different lever relationships of the throttle linkage are to be observed. In addition, according to the type of vehicle, different constructional solutions and irregular or nonuniform maximum gas distances can be given for the gear connection between the gas pedal and the fuel dosing apparatus, which gear connection controls the gas so that the positioning of a switch under such conditions must be faulty also with respect to its accuracy.

Accordingly, the present invention is directed toward providing a speed limiting system which is capable of simplifying the operation of positioning the switch which limits the control process while, at the same time, improving the operating quality of the device.

SUMMARY OF THE INVENTION

Briefly, the present invention may be defined as a method and apparatus for positioning a switch of a speed limiting device in a vehicle, and particularly a system, wherein a vehicle includes a vehicle engine, a fuel dosing apparatus for the engine, an accelerator or gas pedal, a gear connection between the gas pedal and the fuel dosing apparatus and a clutch arrangement connected in said gear connection.

The speed limiting device of the invention includes a servo motor which is switched off by the switch to be controlled, a servo component through which the speed limiting device actuates the clutch arrangement, a push switch, a rate of rotation indicator and a lock for the switch.

In accordance with the present invention, there is provided a method for positioning the switch of the speed limiting device comprising the steps of: starting the vehicle engine; depressing the gas pedal until the fully accelerated or fully depressed position thereof and holding the gas pedal in the fully accelerating position while simultaneously adjusting the servo component in the sense of a throttling of the vehicle engine by means of controlling the servo motor by means of the push switch and observing the rate of rotation indicator; cutting off the servo component stroke corresponding to a predetermined lower boundary of the rate of the revolutions of the vehicle engine; and releasing locking of the switch taken along or entrained by the servo component by means of reversing the rotational direction of the servo motor.

In a preferred arrangement for practicing the method of the invention, the push switch, a flexible cable and a plug or connector form an actuating unit which is independent from the device. A sealable receptacle assigned to the plug is provided in the electronic control unit and the reverse running of the servo motor is blocked with forward running being controlled by means of the push switch when the plug is inserted.

Additionally, the preferred arrangement provides that the switch be arranged on a slide or carriage which is displaceably supported parallel to a threaded spindle which is driven by means of the servo motor and which carries the servo component. Locking means are assigned to a sled, and a switchover or reversing contact bank, which is connected in series with the switch, is arranged on the slide or carriage. When positioning the switch, the servo component acts on the slide in such a way that the circuit of the switch is interrupted by means of the switchover contact bank and the locking means are ineffective.

In an advantageous preferred embodiment of the invention, at least one locking bar or bolt is movably supported at the slide so as to be spring-loaded in such a way that it is perpendicular relative to the transporting direction of the slide. The locking bar is constructed in such a way that it can be coupled with a carrier constructed at the servo component. The switchover contact spring of the contact bank engages in the movement path of the locking bar which is directed perpendicularly relative to the transporting direction of the slide.

The invention provides significant advantage in that the switch may be positioned in one step without manual operation in the servo unit and, specifically, when the servo unit is closed and finally sealed, it can be controlled from a distance, e.g., from the driver's cab.

Additionally, it should be noted that only one person is needed for this purpose and that that person may be located in a ready-to-drive sitting position in the driver's cab, with a high precision positioning being achievable at relatively low cost in terms of the manufacturing technology.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE PREFERRED EMBODIMENT

Figures 1, 2:
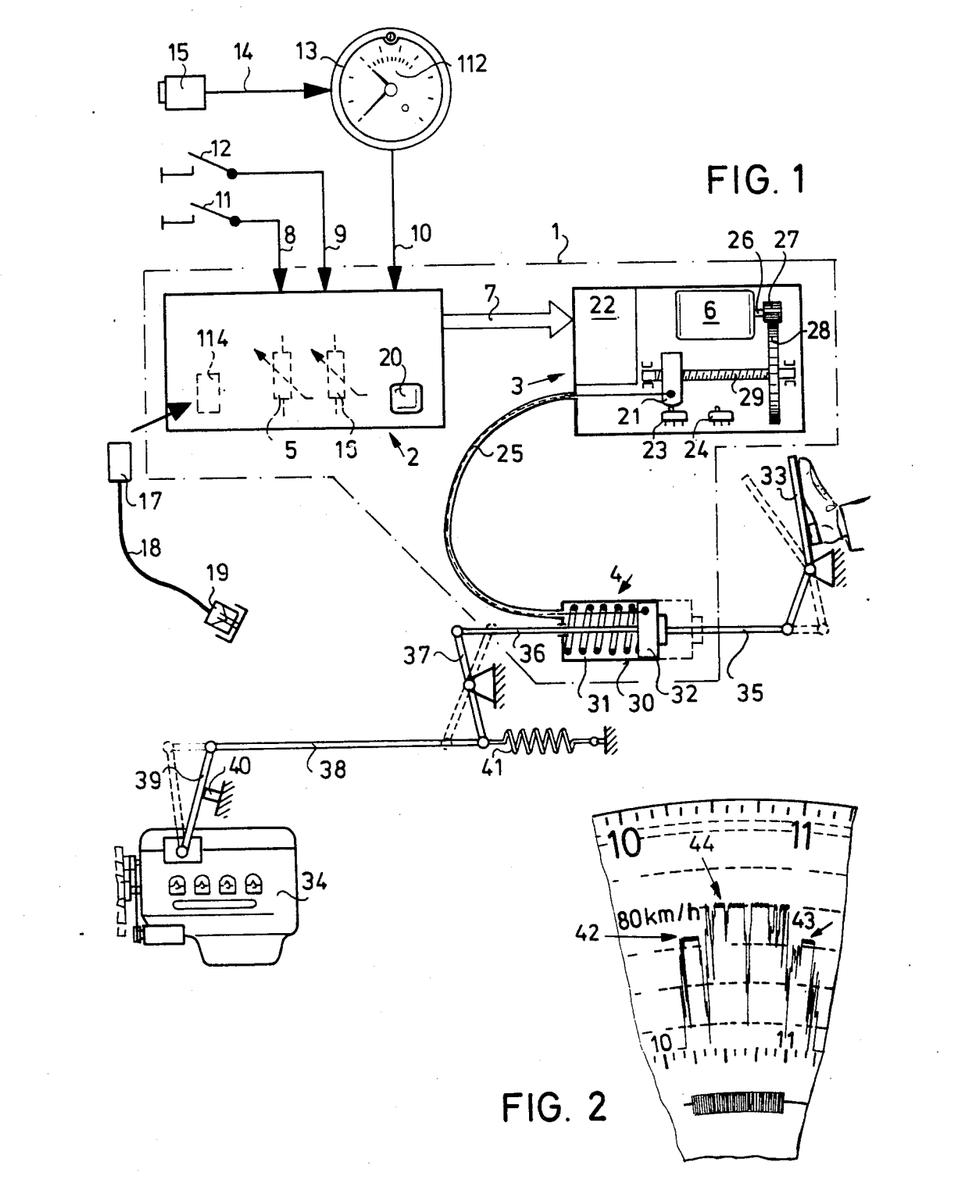
FIG. 1 is a schematic representation of a speed limiting system in accordance with the invention showing engine components connected thereto.
FIG. 2 is a schematic partial representation of a graph showing speed data demonstrating the action of the speed limiting device in accordance with the invention.

Referring now to the drawings and more specifically to FIG. 1, there is shown a system in accordance with the present invention which is embodied in a speed limiting device 1, consisting essentially of an electronic control unit 2, which may be installed, for example, in the driver's cab of a motor vehicle, an electromechanical servo unit 3, which is preferably mounted at the vehicle chassis, and a mechanical clutch mechanism 4 fitted in the throttle linkage of the vehicle.

The control unit has as its function to compare a speed boundary value, which is fixed and determined by means of a potentiometer 5, with the actual speed of the vehicle, and then to feed a corresponding signal in the sense of a throttling of the vehicle engine to a servo motor 6 located in the servo unit 3 by means of a line 7. The signal is delivered at the latest when the boundary value of the speed is exceeded.

On the input side, the electronic control unit 2 is connected through lines 8, 9 and 10 with switches 11 and 12 as well as with a tachograph 13 to which there is assigned, in turn, a rotational value transmitter 15 through a line 14 in a manner which is known to those skilled in the art.

A second speed boundary value, which is adjustable by means of another potentiometer 16, may be selected with the switch 11 which is preferably arranged in the dashboard of a vehicle. The switch 12 is assigned to the vehicle clutch and operates, for example, to release the gas in vehicles with nonsynchronized gear units, while the tachograph 13, assuming that it is appropriately equipped, will already supply the rate of rotation-distance-converted speed measuring pulses by means of the line 10.

Of course, a correspondingly equipped transmitter could also be used instead of the tachograph 13. Additionally, it is also possible that the distance-rate of rotation adaption may be carried out in the control unit 2 itself.

Moreover, a push switch 19, which is provided with a plug 17 and a flexible line 18, is connected with the electronic control unit 2 when the adjusting mode, in accordance with the invention, is commenced, as will be explained in more detailed hereinafter. A key, with which another relatively lower speed boundary value may be selected, is designated by reference numeral 20. Additionally, as will be seen from FIG. 1, a circuit 22 which controls the servo motor 6 independently of the position of a servo component 21, and at least two switches 23 and 24 which are actuated by means of the servo component 21, are arranged in the servo unit 3 outside of the motor 6. The switches 23 and 24 fix, on the one hand, the zero or neutral position (switch 23) and, on the other hand, they fix the end or final position (switch 24) of the speed limiting device 1. The drive of the servo component 21, at one end of which there is articulated the core of a Bowden cable 25, is effected beginning from a toothed wheel 27 which is fastened on the shaft 26 of the servo motor 6 and a toothed wheel 28 engaging with the toothed wheel 27, by means of a threaded spindle 29 which is connected with the toothed wheel 28 so as to be secured against relative rotation. The other end of the Bowden cable core acts as the clutch mechanism 4 or, more precisely, it acts at a piston 32 which is guided in a cylinder 30 and is influenced by a compression spring 31.

The clutch mechanism 4 is inserted or arranged in such a manner in a tie rod 35, 36 of the lever gear unit between a gas or accelerator pedal 33, and the fuel dosing apparatus of the vehicle engine 34, that one part 35 of the tie rod is securely connected with the cylinder 30 and the other part 36 is securely connected with the piston 32. A pivotably supported twin-armed lever 37 of the throttle linkage, together with another tie rod 38, produces the gear connection with an adjusting lever 39, usually arranged at the injection pump of the vehicle engine 34. Additionally, a stop 40 and a restoring spring 41 are operatively engaged in the described throttle linkage.

The driving diagram or graph shown in FIG. 2 indicates that the speed limiting system ultimately enforces, among others, an economical manner of driving in that over a longer period of time, an erratic mode of driving is smoothed, i.e., changes in speed are avoided. Moreover, it can be seen from the diagram or graph of FIG. 2 that the driver actuated the switch 11 in the time domains or ranges 42 and 43 in order to maintain the maximum allowable speed, for example, during travel on a rural road, whereas, in the time domain 44, another road category was traveled with a limit which was predetermined, for example, by means of the potentiometer 5.

Figure 3:
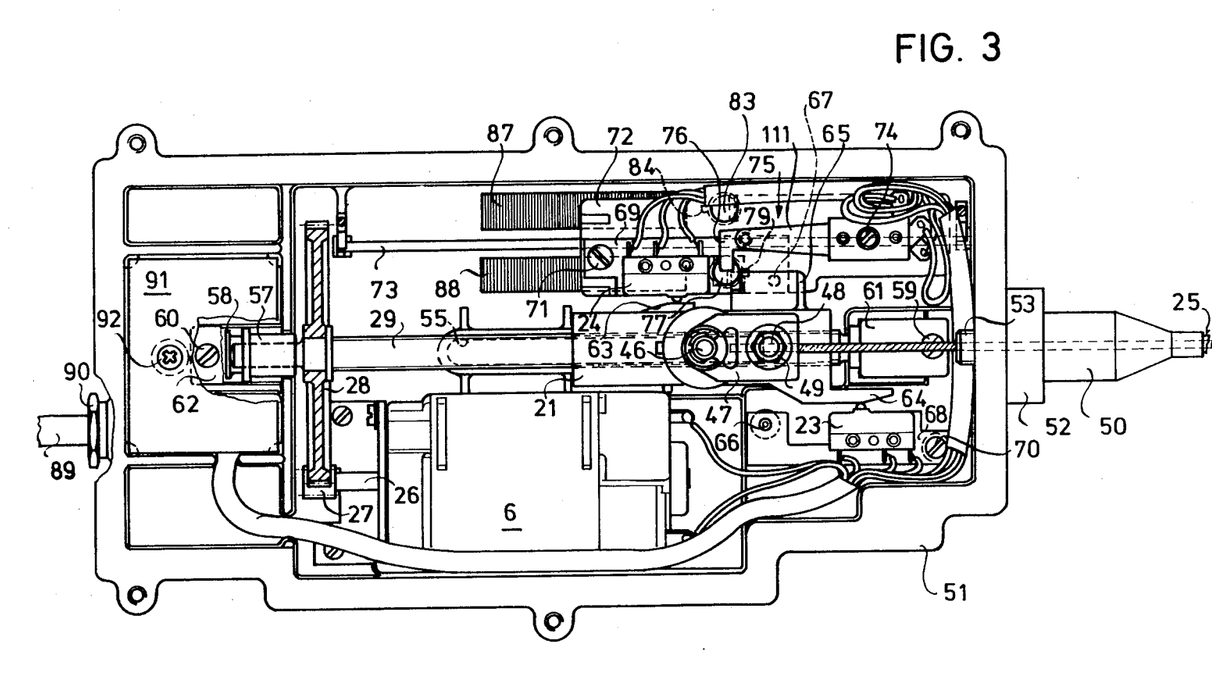
FIG. 3 is a top view of a preferred embodiment of the servo unit of the speed limiting device in accordance with the invention in an initial or starting position with reference to the switch which is to be positioned.

FIG. 3 shows, in top view, a preferred embodiment of the servo unit 3 with the cover removed and having means provided for carrying out the positioning method in accordance with the invention which are located in the zero position of the servo component 21 in an initial position.

The servo component 21, which, as already mentioned previously, is driven by the servo motor 6 through the toothed wheel 27 fastened at its shaft 26, the toothed wheel 28 meshing with the latter and the threaded spindle 29 carries a holder 47 in that the latter is placed on a receptacle 46 formed at the servo component 21 and is secured in a suitable manner, possibly by means of a cover 45. The core of the Bowden cable 25 is secured in the holder 47 by means of a tensioning piece having a threaded shaft 48, not shown in more detail, and a nut 49 assigned to the threaded shaft 48. The casing or jacket of the Bowden cable 25 is supported in a conventional manner by means of an adjustable stop which is covered to a great extent by means of a socket or bush 50 and a union nut or coupling ring 52 holding the socket 50 at the housing 51 of the servo unit 3 with a screw shaft 53 being supported in the wall of the housing 51.

A peg or trunnion 54 (see FIG. 4) is fastened at the servo component 21 and serves as protection against relative rotation in that it engages in a guide groove 55 formed in the housing 51.

Figure 4:
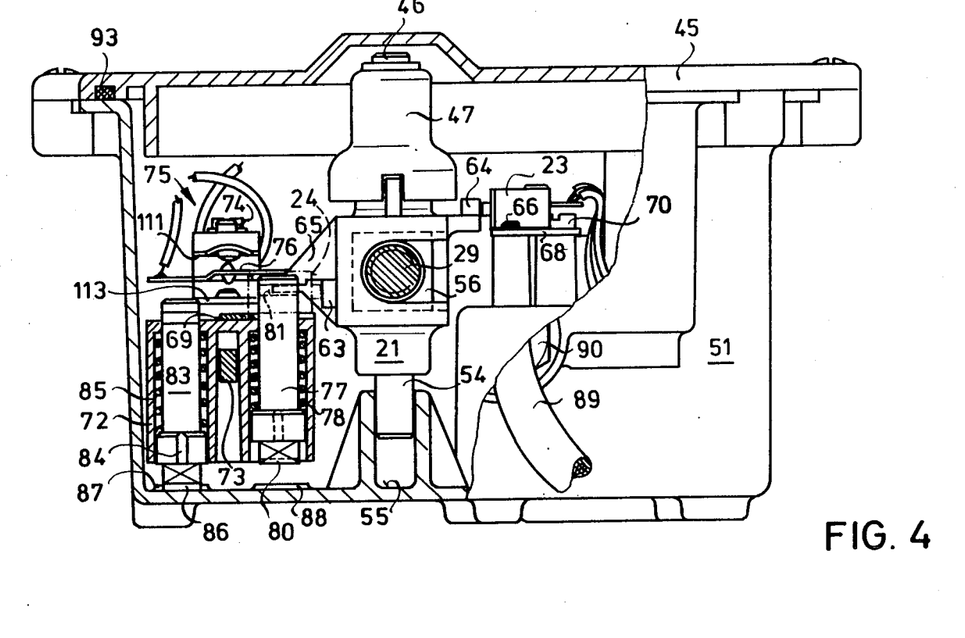
FIG. 4 is a sectional view of the servo unit shown in FIG. 3.

Furthermore, it should be noted that the servo component 21 engages with the threaded spindle 29 by means of two guide nuts inserted in the servo component 21, one of which is shown in FIG. 4 designated by reference numeral 56. Furthermore, exchangeable bearing bushes and guide plates, one of each being designated by reference numerals 57 and 58, respectively, are assigned to the threaded spindle 29 and are held in chambers formed in the housing 51, which chambers are sealed by means of covers 61 and 62 fastened by means of screws 59 and 60. Moreover, switching cams 63 and 64 assigned to switches 23 and 24, constructed as changeover switches, are formed on at the servo component 21 as is a carrier 65. In order to be able to adjust them transversely relative to the movement direction of the switching cams 63 and 64, the switches 23 and 24 are fastened in each instance on carriers 68 and 69 which are pivotable about axles 66 and 67 and are secured by means of screws 70 and 71.

As shown additionally in FIG. 3, the carrier 69 is arranged on a slide or sled 72 which is rotatably supported on a guide rod 73 which is fastened in a suitable manner in the housing 51, with the guide rod 73 preferably having a rectangular cross-section since, protection against relative rotation must be effected for the slide 72. Additionally, a switchover or reversing contact bank 75, having a switchover contact spring 76 which engages in the movement path of a locking bar 77 which is movably supported in the sled 72 so as to be perpendicular relative to its direction of movement, is fastened onto the sled 72 by means of a screw 74. The locking bar 77 is influenced by a pressure spring 78, is guided in the slide 72 in a nonrotatable connection relative thereto by means of a web-slot connection 79 and has locking teeth 80 at one of its front sides or end faces. Moreover, a slot 81 is constructed at the locking bar 77, and the carrier 65 of the servo component 21 engages in the slot 81 in the position shown. Parallel to this, another locking bar 83 is supported in the slide 72. This locking bar 83 is likewise protected against relative rotation by means of a web-slot connection 84 and is under the influence of a pressure spring 85. However, it is arranged in such a way that the locking teeth 86 provided at its front side are directed opposite to that of the locking bar 77. Accordingly, each of the two locking bars 77, 83 cooperates with oppositely toothed locking paths 87 and 88 which are preferably constructed at the bottom of the housing 51.

For the sake of completeness, it should be noted that the cable 89, which is affixed at the housing 51 by means of a nut 90 so as to be free of tension, is identical with the line 7 shown in FIG. 1 leading from the electonic control unit 2. A wiring plate 91 is fastened at the housing 51 by means of a screw 92 and covers a space provided for the electrical structural elements of the engine operating wiring, which structural elements are arranged on the wiring plate 91. As already mentioned, a cover 45 is provided for the housing 51 of the servo unit 3 with the intermediary of a seal 93, the cover 45 being threadedly connected with the housing 51 at a plurality of locations.

Figure 7:
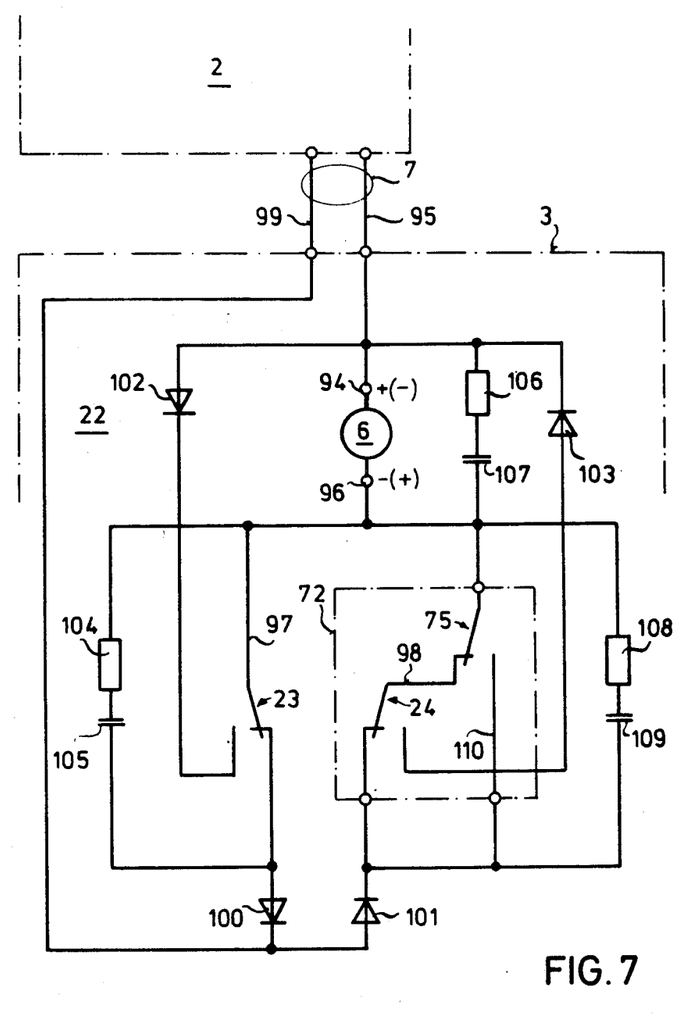
FIG. 7 is a circuit diagram of the circuitry for operating the servo motor independently of the position of the servo component.

In the operating wiring or circuit for the servo motor 6, shown in FIG. 7, one terminal 94 of the servo motor 6 is directly connected with one branch 95 of the line 7 extending from the electronic control unit 2, while the other terminal 96 of the servo motor 6 is connected with the other line branch 99 of the line 7 through two line branches 97 and 98 which are connected in parallel with one another. Diodes 100 and 101 are connected so as to be inverted in the two line branches 97 and 98 in such a way that a positive potential occurring on the line 99 can only reach the terminal 96 of the servo motor 6 through the line branch 98. The servo motor 6 is short-circuited and, accordingly, exactly positioned by means of the diodes 102 and 103 when either the end position or the zero position of the servo component 21 is reached. RC combinations 104/105, 106/107 and 108/109 serve in a manner known to those skilled in the art as anti-interference or screening units, while a line branch 110 bridges the end position switch 24 in a predetermined position of the switchover contact bank 75.

In the circuitry of the wiring diagram shown in FIG. 7, when negative potential occurs at the terminal 96 of the servo motor 6, the servo motor 6 reverses from a control position to a zero position. When the zero position is reached, the switch 23 is actuated and the servo motor 6 is stopped by means of short-circuiting.

If, on the other hand, a control command again occurs, a positive potential or pulse must occur at the terminal 96 of the servo motor 6 on the line branch 99 and, according, through the switches 24 and 75 located in the line branch 98 and arranged on the slide 72, the latter switch serving only to bridge the switch 24 during its positioning in the installation of the speed limiting device 1, in order to shift forward the servo motor. When the servo motor 6 is started in the forward direction, the switch 23 is simultaneously reversed and, accordingly, reverse running of the servo motor 6 is effected. When the servo motor 6 reaches the end position, the reversing or switchover switch 24 is actuated, the line branch 98 is interrupted, the servo motor 6 is short-circuited by the diode 103 and stopped until a potential reversal is effected on the line branches 95 and 99.

Figure 5:
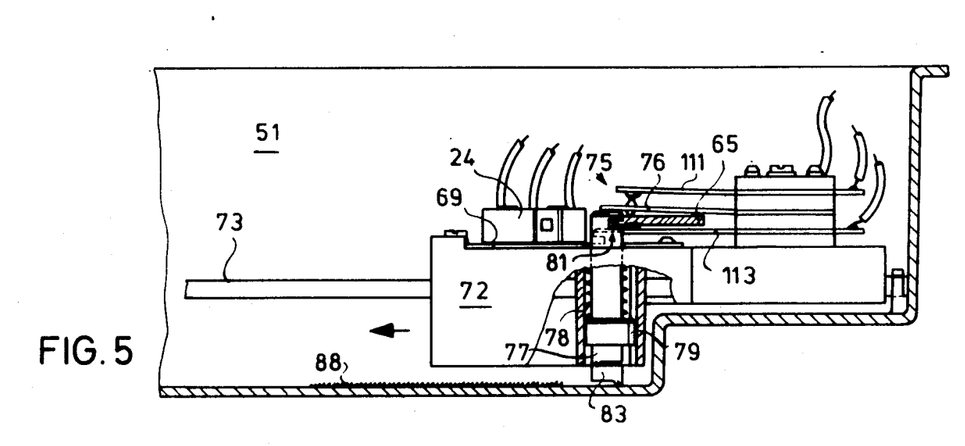
FIG. 5 is a partial sectional view of the servo unit with a side view of the slide carrying the switch shown in the initial position.
Figure 6:
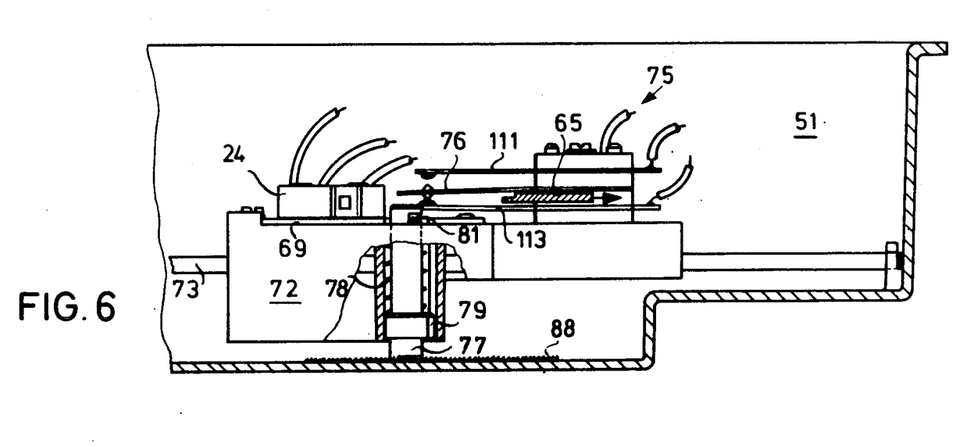
FIG. 6 is a side view of the positioned switch.

When the components of the speed limiting device 1, the electronic control unit 2, the servo unit 3 and the clutch mechanism 4 are assembled in a respective vehicle, then proceeding from the state of the arrangement shown in FIG. 3, between the servo component 21 and the slide 72, in which the carrier 65 formed on at the servo component 21 engages in the slot 81 located in the locking bar 77 and accordingly the locking bar 77 does not engage with the catch path 88 assigned thereto, or is kept from engaging with the catch path 88 assigned thereto during the forward movement of the servo component 21 according to the arrow in FIG. 5, respectively, the positioning of the switch 24 according to the invention is prepared in that the plug 17 assigned to the push switch 19 is plugged into the receptacle 114 provided in the electronic control unit 2 for this purpose. Reversing the servo motor 6 is blocked as a result of this. At the same time, the possibility of keying positive potential on the line branch 97 with the push switch 19 is provided. Additionally, regardless of the fact that the slide 72 is freely displaceable in a certain area desirable for engagement with the servo component 21, as shown in FIGS. 5 and 6, the switch 24 is actuated by means of the switching cam 63 in the sense of switching off a forward movement of the servo component 21 in the initial state of the positioning shown; that is, at the same time, ineffectual, since the switchover contact spring 76 engaging in the movement path of the locking bar 77 cooperates with a contact spring 111 of the switchover contact bank 75, which contact spring 111 is located in the line branch 110, in the sense of a bridging of the switch 24.

When the operation-ready installation of the speed limiting device 1 is terminated, as far as the positioning of the switch 24, the mechanic enters the driver's cab, starts the vehicle engine, observes the rate of rotation indicated, for example, that (112) of the tachograph 13, if available, gradually applies more gas in a stepwise manner so as not to race the vehicle engine unnecessarily, and operates the push switch 19. As long as the push switch 19 is pressed, the servo motor 6 displaces the slide 72, which is connected at the servo component 21, and simultaneously throttles the fuel feed of the vehicle engine 34. When the gas pedal 33 reaches the fully depressed or fully accelerating position and is held in this position, the desired boundary rate of rotation or revolution, for example, the idling rate of revolution in which the control process is to be stopped later during driving operation, can be sensitively cut off. The adjusting mode is broken off by means of subsequently pulling the plug 17, i.e., the electronic control unit 2, which detects the condition V=0 already during the positioning process, controls negative potential on the line branch 99, the rotative direction of the servo motor 6 is reversed and the servo component 21, reversing into the zero position, releases the switch 24 as well as the locking bar 77. As shown in FIG. 6, the locking bar 77 engages with the catch path 88 assigned thereto and, together with the locking bar 83 which was already engaged with the catch path 86 and taken along during the positioning process, fixes the achieved position of the slide 72 and, accordingly, of the end or limit switch 24. Simultaneously, the switchover contact bank 75 is also actuated and the switch 24, in which the switchover contact spring 76 cooperates with the contact spring 113 located in the line branch 98, is activated.

The speed limiting device is ready for use, finally, when the servo unit 3 and the receptacle 114 for the plug 17 are inaccessibly covered and concealed in the electronic control unit 2.

While a specific embodiment of the invention has been shown and described in detail to illustrate the application of the inventive principles, it will be understood that the invention may be embodied otherwise without departing from such principles.

What is claimed is:

1. A method for positioning a switch of a speed limiting device in a vehicle; wherein a vehicle includes a vehicle engine, a fuel dosing apparatus for said engine, a gas pedal, a gear connection between said gas pedal and said fuel dosing apparatus and a clutch arrangement connected in said gear connection; and wherein said speed limiting device includes a servo motor which is switched off by said switch, a servo component through which said speed limiting device actuates said clutch arrangement, a push switch, a rate of rotation indicator and a lock for said switch; said method comprising the steps of:

starting said vehicle engine;

depressing said gas pedal to its fully accelerating position and holding said gas pedal in said fully accelerating position while simultaneously adjusting said servo component in the sense of a throttling of said vehicle engine by means of controlling said servo motor by operation of said push switch and observing said rate of rotation indicator;

cutting off a stroke of said servo component corresponding to a predetermined lower boundary of the rate of revolution of said vehicle engine; and releasing said lock of said switch taken along by said servo component by means of reversing the rotational direction of said servo motor.

2. A speed limiting device for a vehicle including a switch which is positioned for controlling said speed limiting device; wherein said vehicle includes a vehicle engine, a fuel dosing apparatus for said engine, a gas pedal, a gear connection between said gas pedal and said fuel dosing apparatus and a clutch arrangement connected in said gear connection; wherein said speed limiting device includes a servo motor which is switched off by said switch, a servo component through which said speed limiting device actuates said clutch arrangement, a push switch, a rate of rotation indicator and a lock for said switch, and wherein after starting of said engine and depressing said gas pedal to its fully accelerated position and holding said gas pedal in the fully accelerating position, said servo component may be simultaneously adjusted in the sense of throttling said vehicle engine by means of controlling said servo motor by operation of said push switch while observing said rate of rotation indicator, with said servo component having a stroke which may be cut off corresponding to a predetermined lower boundary rate of rotation of said vehicle engine with release of said lock of said switch being taken along by said servo component by means of reversing the rotational direction of said servo motor, said speed limiting device further comprising a slide upon which said switch is arranged, said slide being displaceably supported parallel to a threaded spindle driven by said servo motor and carrying said servo component, said locking means being assigned to said slide, said speed limiting device further comprising a switchover contact bank which is connected in series with said switch and is arranged on said slide such that during the positioning of said switch, said servo component acts on said slide in such a way that said switch is actuated, with a circuit of said switch being provided which is interrupted by means of said switchover contact bank with said locking means being ineffective.

3. A device according to claim 2, wherein said lock includes at least one locking bar supported at said slide so as to be spring-loaded and so as to be movable perpendicularly relative to the transporting direction of said slide, said locking bar being constructed in such a manner that it can be coupled with a carrier arranged at said servo component, said contact bank including a switchover contact spring which engages in the movement path of said locking bar, which path of movement is directed so as to be perpendicular relative to the direction of movement of said slide.

4. A device according to claim 3, wherein said locking bar cooperates with a catch path constructed directly at a housing of said servo unit.

5. An apparatus according to claim 4, further comprising a second locking bar and a further catch path assigned thereto, said catch path and said further catch path having catch toothings constructed at the base of said housing so as to be parallel adjacent to one another and oppositely directed.

6. A device according to claim 2, wherein said slide is supported on a guide bar having a rectangular cross-section.

7. A device according to claim 2, wherein said push switch, together with a flexible cable and a plug, forms an actuating unit which is independent from said device, there being provided an electronic control unit having a sealable receptacle assigned to said plug, said device operating such that when said plug is plugged in, reverse running of said servo motor is blocked and forward running is controlled by means of said push switch.

* * * * *